Feb. 14, 1961 W. L. FIRESTONE 2,972,121
COUPLING SYSTEM
Original Filed June 1, 1953 2 Sheets-Sheet 1
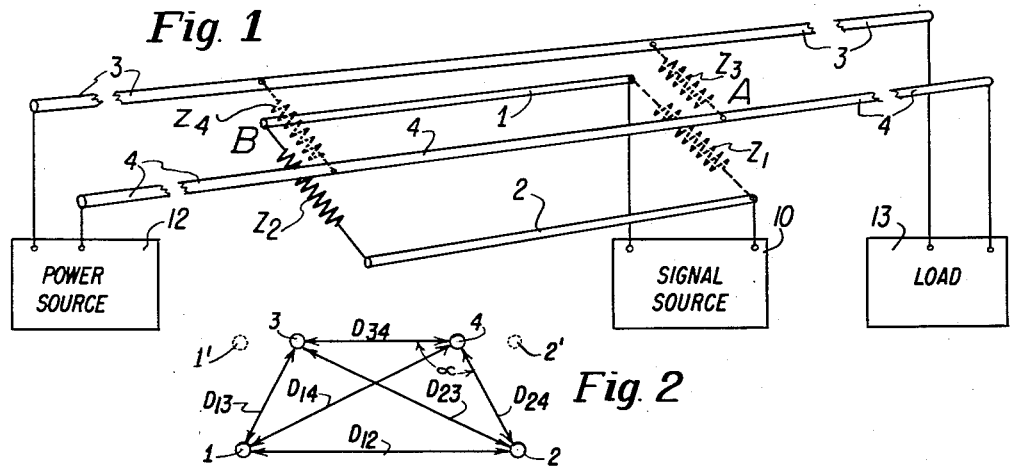
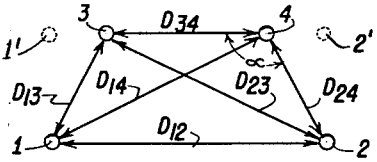
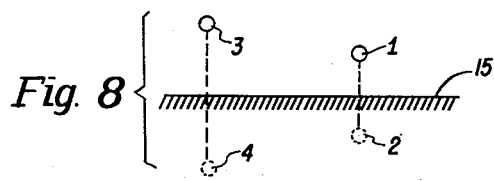
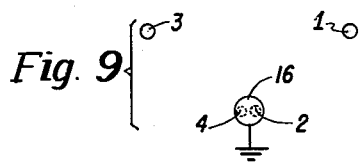
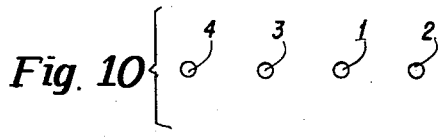
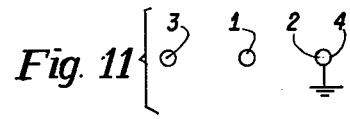
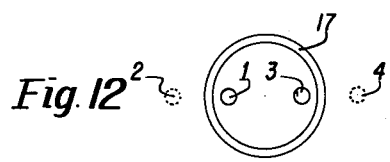
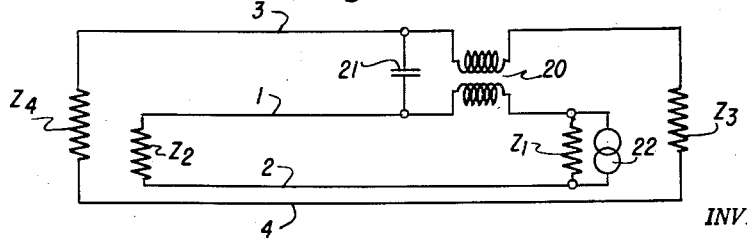
INVENTOR.
William L. Firestone
BY
Atty.

INVENTOR.
William L. Firestone

United States Patent Office 2,972,121
Patented Feb. 14, 1961

2,972,121

COUPLING SYSTEM

William L. Firestone, Chicago, Ill., assignor to Motorola, Inc., Chicago, Ill., a corporation of Illinois Continuation of application Ser. No. 358,727, June 1, 1953. This application Oct. 14, 1957, Ser. No. 690,162

12 Claims. (Cl. 333—10)

This invention relates generally to coupling systems, and more particularly to systems for coupling one circuit to a second circuit, so that the coupled energy flows in the second circuit in one direction only. This application is a continuation of application Serial No. 358,727, filed June 1, 1953, now abandoned.

There are many applications wherein it is desired to couple energy from one circuit to another so that the energy flows in one direction only. As an example, in many cases a power line is also used for transmission of signal energy and it is therefore desired to couple a signal line to the power line so that all the energy flows down the power line to the desired point. As the power line may be at a very high voltage it may be difficult to make a conductive connection thereto, and it is therefore advantageous to couple to the power line through inductive and capacitive coupling therewith without making direct conductive connection thereto.

Couplers for interconnecting wave guide transmission lines which conduct signals of very high frequency have been used which are highly directional. The present invention relates to directional coupling systems for use with open wire conductors for use at lower frequencies.

It is therefore an object of the present invention to provide an improved system for coupling to wire circuits for providing energy thereon in one direction only.

Another object of this invention is to provide a system for coupling to open wire transmission lines without making a direct conductive connection thereto.

A further object of this invention is to provide a coupling system for applying energy in one direction only in a circuit which in itself may be badly matched.

A still further object of this invention is to provide coupling systems for use with various types of transmission lines to provide highly directional coupling to such lines.

A feature of this invention is the provision of a system wherein a signal circuit is coupled through mutual inductance and mutual capacitance to a second circuit and the circuits are terminated with proper impedances so that the coupled signals flow in the second circuit in one direction only.

Another feature of the invention is the provision of a coupling system wherein a signal line is spaced with respect to a propagation line along a portion of the line for applying signals thereto, with the signals being transmitted in one direction only on the propagation line. As the signals on the propagation line are in the opposite direction to the signals in the signal line, the coupler may be considered a reversed coupler.

A further feature of the present invention is the provision of a coupling system wherein signals may be applied to a mismatched line with a very high degree of directionality by properly compensating the termination of the coupling line. This permits the use of available mismatched propagation lines without reconstructing the same.

A still further feature of this invention is the provision of a directional coupling system which is applicable to various types of transmission lines, such as standard two-conductor lines, ground-return lines, and lines in which a common conductor or shield may be used as a part of the signal and propagation lines. The signal line may be positioned in various ways with respect to the propagation line.

Further objects, features and the attending advantages of the invention will be apparent from a consideration of the following description when taken in connection with the accompanying drawings, wherein:

Fig. 1 illustrates the basic system in accordance with the invention;

Fig. 2 is a cross-sectional view of the transmission line coupler;

Figure 3:
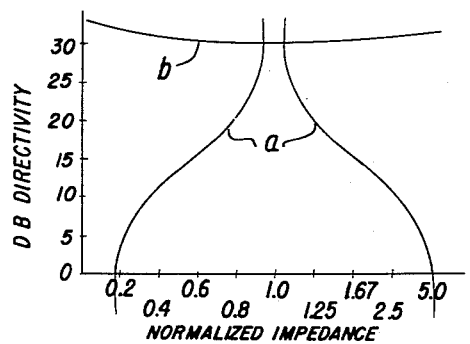
Figure 4:
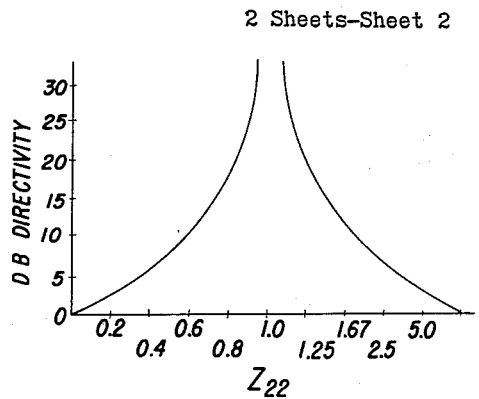
Figure 5:
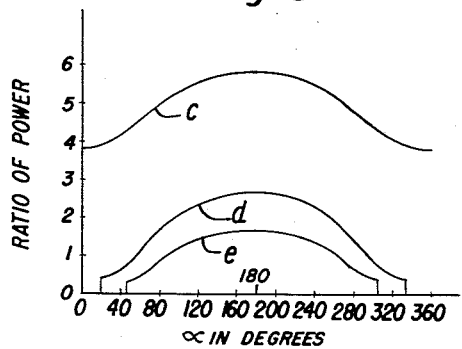
Figure 6:
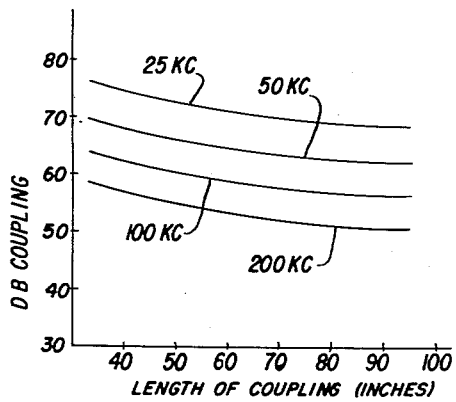
Figure 7:
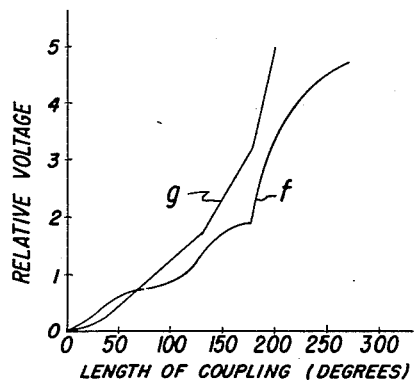

Fig. 3 includes curves showing the directing characteristics with variations of the terminating impedances of the propagating line;

Fig. 4 is a curve showing the directivity characteristics with variation of the terminating impedance of the signal line;

Fig. 5 shows variation of the coupling efficiency with relative position of the conductors;

Figs. 6 and 7 show variation of coupling efficiency with the length of the coupling conductors;

Figs. 8 to 12 show application of the invention to various different types of transmission lines; and Fig. 13 illustrates a lumped constant circuit in accordance with the invention.

In practicing the invention there is provided a directional coupling system including a first main circuit or line, which may be used for a primary purpose other than the transmission of signals. A signal circuit or line is coupled to the main line, both by mutual inductance and mutual capacitance. This may be accomplished by positioning the coupling line along the main line in spaced relation thereto between first and second points. Signals applied to the signal coupling line from one end to the other are transferred to the main line in the reverse direction so that the signals flow from the first point in a direction away from the second point. For complete directivity, the effective normalized terminating impedance of the main line at the first point and of the coupling line at the second point must be reciprocals of each other. That is, the product of the effective normalized terminating impedance of the main line at the first point, and the effective normalized terminating impedance of the coupling line at the second point must be equal to 1. This may be accomplished by terminating each of the lines in its characteristic impedance, or by causing the normalized impedances to be varied in a reciprocal manner with respect to each other.

The coupling system is effective for transmission lines wherein the conductors have various different positions with respect to each other, with the efficiency of coupling depending upon the positions of the conductors and upon the length of the region over which the transmission lines are closely spaced with respect to each other. The coupling system may be applied to lines of various constructions such as full two-conductor lines, grounded return lines, and systems wherein the main and coupling lines have a common return which may be grounded or ungrounded, and which may be in the form of a wire conductor or a shield about the other conductors. The coupling system in accordance with the invention may also be applied by the use of lumped constants for providing the capacitive and inductive coupling between the circuits.

Referring now to the drawing, in Fig. 1 there is illustrated the system in accordance with the invention as applied to two wire transmission lines. The signal line is formed by conductors 1 and 2 and the main or propagating transmission line is formed by conductors 3 and 4.

The two lines are positioned in spaced relation with respect to each other between points A and B. Signals are applied from a source 10 to the lines 1 and 2 which are terminated in impedances $Z_1$ and $Z_2$. The impedance $Z_1$ is shown dotted as it may be formed by the impedance of the signal source 10. The lines 3 and 4 connect a power source 12 with a load 13. The impedances $Z_3$ and $Z_4$ represent the effective impedances of the lines at the points A and B, and include the impedances of the source 12 and the load 13. Although the specific position of the conductors 1 and 2 with respect to the conductors 3 and 4 may be varied as will be set forth more fully, and may be either symmetrical or unsymmetrical, a cross-sectional view showing the positions of the conductors used in making calculations and tests is provided in Fig. 2.

It has been proved both mathematically and by a practical experimentation that when the transmission line including conductors 1, 2 and the transmission line including conductors 3, 4 are both terminated in their characteristic impedance and are therefore matched, the current induced by conductors 1, 2 into conductors 3, 4 through the mutual inductive and capacitive coupling therebetween is such that signals from the source 10 induced in the transmission line 3, 4 flow only in the direction of the load. That is, the current in the line 1, 2 flowing to the left is coupled to the line 3, 4 and produces a current therein flowing to the right only. This result takes place because the electromagnetic coupling produces currents which are continuous in the line 3, 4 and the capacitive coupling produces currents therein flowing in either direction from the coupling. Accordingly, the currents to the left subtract and the currents to the right add. As the inductive and capacitive coupling are equal, the current ot the left will be completely balanced out and the current to the right will be maximum.

The basic equation for the system for providing the reverse directional coupling is that the mutual inductive coupling M divided by the mutual capacitive coupling $C_m$ is equal to the characteristic impedance $Z_{01}$ of the signal line 1, 2 times the characteristic impedance $Z_{03}$ of the propagating line 3, 4.

$$\frac{M}{C_m} = Z_{01} \times Z_{03}$$

When the lines are perfectly matched the current resulting from the capacitive coupling will be equal to the current resulting from inductive coupling, and as the currents in one direction will cancel, and in the other direction will add, complete directivity will result. As will be set forth more fully the magnitude of the coupling and the effectiveness of the signal transfer will depend on the physical position of the lines.

When the line 1, 2 is properly matched, the impedances $Z_1$ and $Z_2$ which terminate the coupling line will be the characteristic impedance of the line $Z_{01}$. The coupling characteristics of the line will change as the actual impedances $Z_1$ and $Z_2$ vary from this characteristic impedance $Z_{01}$. It is the common practice to refer to normalized impedances which are the ratio of the actual terminating impedance to the characteristic impedance of the line. The normalized impedance of the line 1, 2 at the right end of the line, point A, will be designated $Z_{11}$, and the normalized impedance at the left end of the line, point B, will be designated $Z_{22}$.

Similarly, the line 3, 4 will have a characteristic impedance $Z_{03}$, and when the line is matched the impedances $Z_3$ and $Z_4$ will be equal to $Z_{03}$. The impedances $Z_3$ and $Z_4$ are the effective impedances at points A and B, and the effective normalized impedances at these points will be designated $Z_{33}$ and $Z_{44}$ respectively.

As stated above, when the lines are both perfectly matched, the coupling system will provide reversed coupling from the line 1, 2 and to the line 3, 4 and vice versa. If it is desired to send the signals to the left, the signal source must be applied at the left end of the line 1, 2, and the signals will then be applied to the right on line 1, 2, and through reverse coupling will be applied to the left on line 3, 4.

In the event that the propagating line is not terminated in its characteristic impedance and is therefore not perfectly matched, it is possible to obtain completely directional coupling between the lines by adjusting the impedance of the signal line to compensate for the mismatch. This compensation may be provided by adjusting the normalized impedance $Z_{11}$ so that this impedance times the normalized impedance $Z_{44}$ is equal to unity, and by adjusting the normalized impedance $Z_{22}$ so that this impedance times the normalized impedance $Z_{33}$ is equal to unity.

In addition to the above conditions which provide complete directivity in either direction, there are other special conditions wherein complete directivity in one direction is provided. Considering the system of Fig. 1 wherein the signal from point A of line 1, 2 is applied to the right on line 3, 4 it has been proven that when the impedance $Z_2$ is the characteristic impedance ($Z_{22}=1$), and when impedance $Z_3$ is the characteristic impedance of the line 3, 4 ($Z_{33}=1$), all of the energy coupled to the line 3, 4 will be applied to the right toward the load 13 so that perfect directivity is obtained. It has been further shown that it is not necessary that the impedances $Z_2$ and $Z_3$ be equal to the characteristic impedances of the lines, but that if the normalized impedance $Z_{22}$ times the normalized impedance $Z_{33}$ is equal 1 ($Z_{22} \times Z_{33}=1$), that is, if these two impedances are the reciprocals of each other, and thereby compensate for each other, complete directivity will be obtained in the direction desired.

It will be obvious from the above, that if the signal source were connected to the left end of the line 1, 2, at point B, a perfect directional coupler would be provided when the impedances $Z_{11}$ and $Z_{44}$ are each equal to 1, or when the product of $Z_{11}$ times $Z_{44}$ is equal to 1. In each of these cases the signal applied at point B will be reversely coupled back on line 3, 4 and is therefore applied to the left toward the power source 12.

If the normalized impedance $Z_{33}$ of the line 3, 4 at point A of Fig. 1 varies from 1, the degree of directivity will be reduced. This is shown by curve $a$ of Fig. 3 which shows the variation of directivity with variation of $Z_{33}$. The directivity is shown as infinite when the impedance $Z_{33}$ is equal to 1 and falls off sharply so that very little energy is coupled in the desired direction as the impedance varies. Curve $b$ of Fig. 3 shows the variation of the directivity with variation of the impedance $Z_{44}$ when impedances $Z_{33}$ and $Z_{22}$ are both equal to unity. This shows that variation of $Z_{44}$ has little effect when coupling as shown in Fig. 1 is used. This curve shows the results of experimental tests, theoretically the curve would be flat and the directivity would be infinite. Fig. 4 shows the variation in directivity with variation of the normalized impedance $Z_{22}$ of line 1, 2. With the propagation line 3, 4 balanced the directivity drops off sharply as impedance $Z_{22}$ varies from unity. This curve is supported both by theoretical computations and by experimental tests.

As previously stated, the amount of coupling depends upon the physical configuration of the transmission lines and the position thereof with respect to each other. Fig. 5 includes a plurality of curves showing the variation of the coupling with the position of the lines 1 and 2 with respect to the lines 3 and 4 for a symmetrical condition as shown in Fig. 2. The angle alpha represents the angular position of the lines 1 and 2 with respect to the lines 3 and 4. The curves of Fig. 5 all show that the coupling is a maximum when this angle is 180°. Accordingly, it is desirable for the coupling lines 1 and 2 to be in the dotted position designated 1' and 2' in Fig. 2, wherein the lines 1', 2', 3 and 4 are all in a single plane. The curves of Fig. 5 show the relative coupling with various spacings, with the curve $c$ being the smallest spacing, curve $d$ the larger spacing, and curve $e$ a still larger spacing. It is apparent from this that closer spacing provides greater coupling. It is to be pointed out, however, that the spacing permitted will depends upon the voltages involved and it may be necessary to provide wide spacing in practical applications to prevent arc over.

Fig. 6 illustrates the variation of the amount of coupling with the length of the coupled portions for lengths which are much shorter than a wave length. The curve shows the decibel loss which is less at high frequencies since the coupling is a greater portion of a wave length and the loss decreases with the length of the coupling element but is shown not to be critical. Fig. 7 shows that the relative coupling can be increased by using a coupling length approaching a wave length of the frequency involved. Curve $f$ of Fig. 7 shows the relative power gain obtained by using a signal line which is transposed every quarter wave length. Curve $q$ shows the gain obtained by using a signal line having 240° phase shifters positioned at 60 degree intervals therein. It is apparent that a substantial increase in power is provided by the latter arrangement.

The foregoing description has been based on the use of transmission lines having two spaced wire conductors. The coupling system, however, is also applicable to various other types of transmission lines. The application of the coupling system to grounded return lines is illustrated in Fig. 8. In this figure the signal is applied to a coupling line formed by the conductor 1 and ground 15. The propagation line is formed by conductor 3 and the ground 15. The effect of ground is to provide return lines which are reflections of the conductors 1 and 3 of the transmission lines. Therefore, the ground 15 provides a conductor shown dotted as 2 which is the image of conductor 1, and another conductor shown dotted as 4 which is the image of conductor 3. By considering the images provided by ground the foregoing analysis applies directly to this system, and directive coupling may be obtained by meeting the conditions set forth above with respect to two-wire transmission lines.

It is also possible to provide the directional coupling system in accordance with the invention in a three-wire system. This is illustrated in Fig. 9 wherein a signal line is formed by conductor 1 and conductor 16, and the propagation line is formed by conductor 3 and the conductor 16. The common conductor 16, which is grounded, acts somewhat similar to the ground in Fig. 8 with both conductors 1 and 3 being reflected therein. Accordingly, the conductor 16 actually is equivalent to the image conductors 2 and 4, and directional coupling applies from the circuit including conductors 1 and 2 to the circuit including conductors 3 and 4 in the manner which has been fully set forth above.

A still further embodiment of the invention is shown in Fig. 10 wherein the signal line formed by conductors 1 and 2 is arranged side by side with the propagation line including conductors 3 and 4. Such an arrangement has been found to operate in accordance with the rules set forth above. When the outside conductors 2 and 4 are grounded, directional coupling still occurs, and the amount of energy coupled is increased. A special form of this system is shown in Fig. 11 wherein the conductors 2 and 4 are replaced by a single conductor. This operates generally similar to the system of Fig. 9 which has been described above.

In Fig. 12 there is shown another form of the invention wherein the transmission lines are formed by conductors within a grounded shield 17. The signal line is formed by the conductor 1 and the shield 17 and the propagation line is formed by the conductor 3 and the shield 17. The shield 17 therefore forms a common return line. Again, the shield in effect provides images of the wires 1 and 3. These images are indicated as conductors 2 and 4 shown in dotted lines in Fig. 12. This system therefore resolves into a system as illustrated in Fig. 10 wherein two side by side lines are used. It has been proven that the system of Fig. 12, when considering the images, conforms to the theory previously set forth and may be effectively used as a directional coupler.

In Fig. 13 there is illustrated a coupling system having lumped constants, with the coupling circuit being formed by conductors 1 and 2 and the propagating circuit being formed by conductors 3 and 4 as in Fig. 1. The coupling circuit is terminated by impedances $Z_1$ and $Z_2$, and the main circuit by impedances $Z_3$ and $Z_4$. Coupling between the two circuits is provided by the transformer 20 which has the windings thereof inserted in conductors 1 and 3, and by the capacitor 21 which joins conductors 1 and 3. This lumped circuit may provide the entire coupling and the lines themselves may provide no coupling. It has been established both mathematically and by actual testing that directional coupling takes place between the circuit including conductors 1 and 2 and the circuit including conductors 3 and 4 when the terminating impedances have the proper relationships as has been set forth above. It will be apparent that the conductors 2 and 4 can be replaced by a common conductor as in Fig. 9.

Considering Fig. 13 more specifically, if the impedance $Z_2$ is the characteristic impedance $Z_{01}$ of the coupling line, and the impedance $Z_3$ is the characteristic impedance $Z_{03}$ of the main line, all of the energy coupled to the main line, by the generator 22 connected to impedance $Z_1$, will flow to the right in the circuit toward impedance $Z_3$. If the impedance $Z_4$ is the characteristic impedance $Z_{03}$ of the main line, and the transformer winding is reversed, all of the energy coupled to the main line will flow to the left in the circuit toward the impedance $Z_4$. Also, if the normalized impedances $Z_2$ and $Z_3$ have such relationship that the product thereof is equal to 1, the directionality of the coupling will be complete as has been fully set forth above with respect to the prior embodiments of the invention.

Furthermore it has been determined that if in Fig. 13 the coupling line 1, 2 is removed and only the lumped coupling elements retained a directional coupler still results. Also, if in Fig. 13 both lines are removed directional coupler action may still be made to exist if the lumped coupling components are varied somewhat from their required values for use with transmission lines.

It is therefore seen that a directional coupling system is provided which is suitable for use in many different applications. The system may be applied by using closely spaced transmission lines wherein mutual inductance and capacitance is provided between the conductors of the lines themselves, or may be provided by circuits wherein lumped constants are used. In either case by controlling the terminating impedances of the lines or circuits the directivity of the currents applied may be controlled so that all of the energy flows in one direction and the coupled energy is not diverted from the desired path. Application to transmission lines of various types have been shown and it is pointed out that in all of these cases the coupling is provided without direct electrical connection. This is an important advantage since it may be decided to couple to power lines operating at very high voltage and direct conductive coupling requires expensive components and results in difficult operations.

Although a plurality of embodiments of the invention have been illustrated, it is obvious that the invention may also be applied to other forms, and it is intended to cover all such forms within the scope of the appended claims.

I claim:

1. A transmission line directional coupling system including in combination, a first transmission line adapted to be coupled to a signal source, a second transmission line terminated in an impedance differing from the characteristic impedance thereof and serving to propagate the signal energy, said first and second transmission lines having portions positioned in spaced relation with respect to each other extending between first and second points, and means applying signal energy to said first transmission line in the direction from said first point to said second point, said first transmission line being constructed so that the effective normalized terminating impedance thereof at said second point is the reciprocal of the effective normalized terminating impedance of said second transmission line at said first point, whereby energy from said first transmission line is coupled to said second transmission line and substantially all said coupled energy flows from said coupled portion of said second line in the direction away from said second point.

2. A coupling system in accordance with claim 1, wherein said first and second transmission lines each includes a pair of spaced conductors, and said conductors of said first line are positioned symmetrically with respect to said conductors of said second line.

3. A coupling system in accordance with claim 2, wherein said conductors of said second line are positioned on either side of said conductors of said first line, with all said conductors being positioned substantially in a plane.

4. A coupling system in accordance with claim 1 wherein said first and second transmission lines each includes a pair of spaced conductors, with said pairs of conductors being positioned side by side and substantially in a plane.

5. A coupling system in accordance with claim 1 wherein said first and second transmission lines each includes a separate conductor and said lines include a common conductor.

6. A system for coupling signal energy to a transmission line having a primary purpose other than the transmission of such signal energy, and in which the transmission line includes elongated spaced conductors and is terminated in an impedance differing from its characteristic impedance, said system including in combination, a coupling line including at least one conductor in spaced relation with a conductor of the transmission line between first and second points on the line so that inductive and capacitive coupling is provided therebetween, said coupling line being constructed to have an effective normalized terminating impedance at said second point substantially equal to the reciprocal of the effective normalized terminating impedance of the transmission line at said first point thereon, and means for applying signal energy to said coupling line at said first point thereon, whereby substantially all the signal energy applied to said coupling line from said first point to said second point is coupled to the transmission line and is caused to flow therein in the direction from said second point to said first point.

7. A system for coupling signal energy to a transmission line which is terminated at a first point in an impedance differing from its characteristic impedance, said system including coupling line means in inductive and capacitive relation to the transmission line, said coupling line means being constructed to have an effective normalized terminating impedance at a second point substantially equal to the reciprocal of the effective normalized terminating impedance of the transmission line at said first point thereon, and means for applying signal energy to said coupling line means adjacent said first point on the transmission line, whereby substantially all the signal energy applied to said coupling line means is caused to flow in the transmission line in the direction from said second point to said first point.

8. A signal energy coupling system in accordance with claim 7 including transformer means and condenser means connecting said coupling line means to the transmission line to apply energy thereto.

9. A transmission line directional coupling system including in combination, first and second coupled transmission lines each including a separate conductor and including one conductor common to said first and second lines, said separate conductors of said first and second lines having portions positioned in spaced relation with respect to each other between first and second points, and means applying signal energy to said first transmission line in the direction from said first point to said second point, said second transmission line being terminated in an impedance differing from the characteristic impedance thereof, said first transmission line being constructed so that the effective normalized terminating impedance thereof at said second point is the reciprocal of the effective normalized terminating impedance of said second transmission line at said first point, whereby energy from said first transmission line is coupled to said second transmission line with substantially all said coupled energy flowing from said coupled portion of said second line in the direction away from said second point.

10. A coupling system in accordance with claim 9 wherein said separate conductors and said common conductor are substantially uniformly spaced with respect to each other in a plane, and said common conductor is connected to ground.

11. A coupling system in accordance with claim 9 wherein said common conductor is symmetrically positioned with respect to said separate conductors of said first and second transmission lines.

12. A transmission line directional coupling system including in combination, first and second coupled transmission lines each including a separate conductor and including one conductor common to said first and second lines, said separate and common conductors of said first and second lines having portions positioned substantially in a common plane and in substantially parallel spaced relation with respect to each other between first and second points on said lines, and means applying signal energy to said first transmission line in the direction from said first point to said second point, said second transmission line having an impedance at said first point which differs from the characteristic impedance of said second line, said first transmission line being constructed so that the effective normalized terminating impedance thereof at said second point is the reciprocal of the effective normalized terminating impedance of said second transmission line at said first point, whereby energy from said first transmission line is coupled to said second transmission line with substantially all said coupled energy flowing from said coupled portion of said second line in the direction away from said second point.

References Cited in the file of this patent

UNITED STATES PATENTS

| 2,723,378 | Clavier | Nov. 8, 1955 |
| 2,775,740 | Oliver | Dec. 25, 1956 |

OTHER REFERENCES

Publication: "Wireless Engineer," vol. 20, No. 239, August 1943; article by Howe, pages 365–367.

"Electrosvyaz," vol. IX, No. 4, April 1941, pages 9–15 (R.T.P. Translation No. 1525, 8 pages).